No. 633,576. Patented Sept. 26, 1899.
L. W. DOWNES.
CASING FOR AND MOUNTING OF ELECTRICAL FUSES OR CUT-OUTS.
(Application filed Jan. 12, 1899.)
(No Model.)
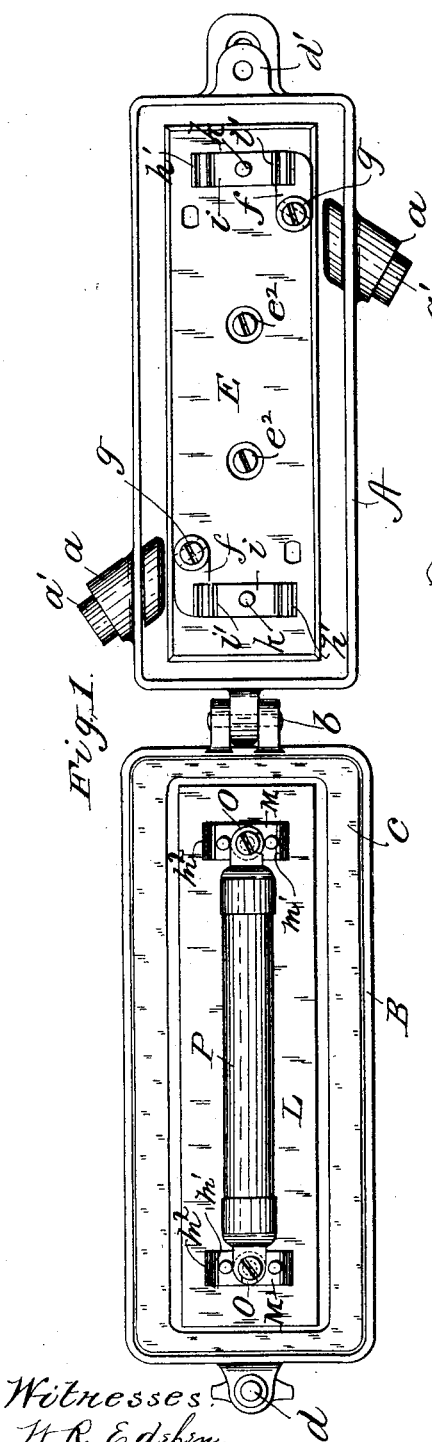
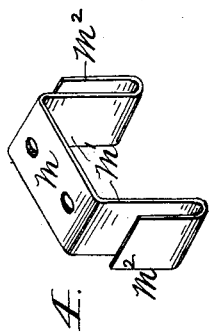
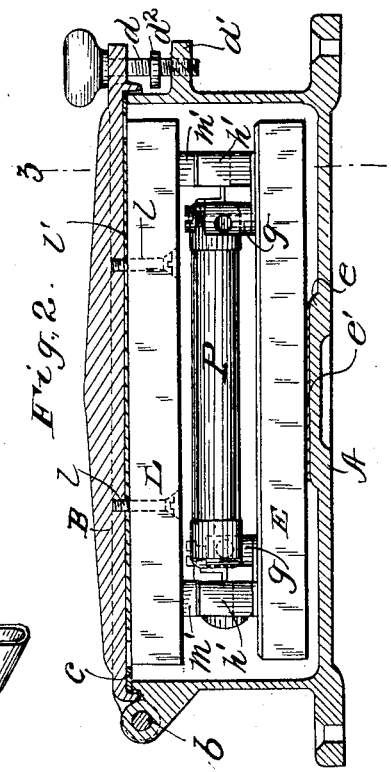
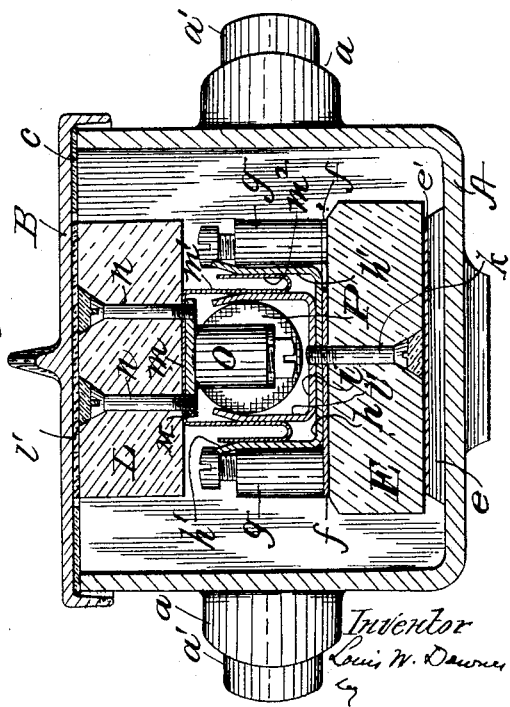
Witnesses
Inventor

UNITED STATES PATENT OFFICE.

LOUIS W. DOWNES, OF PROVIDENCE, RHODE ISLAND, ASSIGNOR TO THE D. & W. FUSE COMPANY, OF SAME PLACE.

CASING FOR AND MOUNTING OF ELECTRICAL FUSES OR CUT-OUTS.

SPECIFICATION forming part of Letters Patent No. 633,576, dated September 26, 1899.

Application filed January 12, 1899. Serial No. 701,946. (No model.)

*To all whom it may concern:*

Be it known that I, LOUIS W. DOWNES, a resident of the city of Providence, State of Rhode Island, have invented a new and useful Improvement in Casings for and Mounting of Electrical Fuses or Cut-Outs, which invention is fully set forth in the following specification.

My present invention relates to improvements in inclosing casings or boxes for and the mounting of electrical fuses or cut-outs adapted particularly for use in connection with high-tension alternating currents—say from one thousand to two thousand volts—or with any current that is apt to be injurious to a lineman in the act of inserting a new fuse in the line in place of one that has been burned out.

The principal object of the invention is to enable a lineman to re-fuse the circuit on dead terminals, thus insuring him against dangerous contact with the circuit. This object I accomplish by making the fuse casing or box in two parts and on one part mounting the live terminals connected in the circuit and on the other part, preferably a cover, mounting the terminals between which the fuse is connected. When the parts of the box are brought together or, in other words, when the cover is in its closed position, the contacts on the one part engage the live contacts on the other part, thus completing the circuit through the fuse. When the two parts are separated or the cover is in its open position, the lineman can connect the fuse between the then dead terminals on the cover with perfect safety.

The features above referred to, as well as other important features of my invention, will be best understood by reference to the accompanying drawings, wherein—

Figure 1 is a front elevation of the box with the cover thrown open. Fig. 2 is a vertical longitudinal sectional view therethrough. Fig. 3 is a transverse sectional view on line 3 of Fig 2, and Fig. 4 is a detail of one of the double-contact plates.

Referring to the drawings, A represents the box or casing, preferably of oblong shape, and B is a cover hinged to box A at $b$ and having a packing $c$ on its inner face, which is adapted to bear against the edge of the box and form a water-tight joint when the cover is closed and clamped tightly in place by thumb-screw $d$, carried by the cover and engaging an ear $d'$ on the box. A nut $d^2$ on the thumb-screw prevents it from becoming detached from the lid and lost when the lid is open.

E is a block of porcelain or any other suitable non-conducting or insulating material mounted upon an elevation $e$ in the bottom of box A, a layer of felt $e'$ being interposed. Screws $e^2$, Fig. 1, tightly secure block E in place.

On opposite ends of block E are mounted angular plates $ff$, each carrying a binding-post $g$, which are connected to the line-wires, said wires entering the box or casing through openings $a\ a$ in the sides thereof lined with porcelain bushings $a'\ a'$. Against each plate $f$ and in electrical contact therewith is a U-shaped piece $h$, having upwardly-projecting diverging arms $h'\ h'$ at opposite ends, Fig. 3. Between the arms of each U-shaped piece $h$ and in electrical contact therewith is a second U-shaped piece $i$, having converging arms $i'$ at opposite ends. Plate $f$, U-shaped piece $h$, and U-shaped piece $i$ are secured together and to block E by screw $k$.

L is a block of porcelain (or other non-conducting material, secured to cover B by screws $l\ l$, (see dotted lines, Fig. 2,) a packing $l'$ of felt being interposed to form a solid connection. At each end of block L is mounted a double contact or terminal M, consisting of a flat brass strip secured at its central part $m$ (see Figs. 3 and 4) against block L by screws $n$ and at its ends bent at right angles to the face of the block, as at $m'$, each end being then bent backwardly on itself, as at $m^2$, forming spring-arms. Binding-posts O O are secured against and make electrical contact with the part $m$ of terminals M M, respectively, being held in place by screws $n\ n$ already referred to.

P is an electrical fuse removably secured between the binding-posts O O in a well-known manner.

In operation when the cover B is thrown open, as shown in Fig. 1, the terminals thereon are dead and a lineman may re-fuse the circuit with perfect safety from contact with dangerous live terminals. The closing of the cover acts to switch the fuse into the circuit. The spring-arms of the double contacts on the cover, formed by the parts $m'$ and $m^2$, force themselves respectively into the converging openings between the several pairs of arms $h'$ and $i'$ of the ∪-shaped plates mounted on block E, thus completing the circuit connections from the line-terminals on the block E through the contact-plates and arms thereof to the spring-arms of the double contacts mounted on block L through binding-posts O O and fuse P. When in this position, it will be seen that the binding-posts O O occupy the space between the arms $i'$ of ∪-shaped piece $i$ and that generally a very compact arrangement is secured.

Having thus described my invention, what I claim as new, and desire to secure by Letters Patent, is—

The combination with the base and cover of a two-part inclosing casing for electrical fuses, of insulating-blocks mounted one on each part, two binding-posts in electrical connection with and each located between two spring-arms of a double contact, said binding-posts and contacts being mounted on the insulating-plate on the cover, an electrical fuse removably connected between the binding-posts, ∪-shaped contacts one mounted at each end of the insulating-block on the base and connected respectively with circuit-terminals and so positioned that the arms thereof are engaged respectively by the spring-arms of the double contacts on the cover so as to complete the circuit through the fuse when the cover is closed, substantially as described.

In testimony whereof I have signed this specification in the presence of two subscribing witnesses.

LOUIS W. DOWNES.

Witnesses:
JOHN HENSHAW,
JAMES H. THURSTON.